United States Patent
Friedman et al.

[15] 3,649,296
[45] Mar. 14, 1972

[54] STABILIZED ROASTED COFFEE AROMA

[72] Inventors: Herman H. Friedman, Bayside, N.Y.; Donald K. Pennelle, Las Vegas, Nev.

[73] Assignee: General Foods Corporation, White Plains, N.Y.

[22] Filed: Jan. 19, 1970

[21] Appl. No.: 4,105

[52] U.S. Cl. .................................................................99/71
[51] Int. Cl. ........................................................A23f 1/08
[58] Field of Search .............................99/65, 71; 260/653

[56] References Cited

UNITED STATES PATENTS

| | | | |
|---|---|---|---|
| 3,418,134 | 12/1968 | Rooker | 99/65 X |
| 3,244,533 | 4/1966 | Clinton et al. | 99/71 |
| 3,077,405 | 2/1963 | Clinton et al. | 99/71 |
| 3,148,070 | 9/1964 | Mishkin et al. | 99/71 |
| 3,155,523 | 11/1964 | Reich | 99/71 |
| 3,181,952 | 5/1965 | Mastrangelo | 99/71 |

*Primary Examiner*—Frank W. Lutter
*Assistant Examiner*—William L. Mentlik
*Attorney*—Howard J. Newby, Bruno P. Struzzi and Thomas V. Sullivan

[57] ABSTRACT

The aroma of roasted coffee is stabilized and intensified by solvent extracting an aqueous mixture of the aroma with a low-temperature boiling fluorinated hydrocarbon solvent. The roasted coffee aroma-containing solvent is emulsified with an edible oil, after which substantially all of the solvent is separated as a vapor prior to, or concurrently with combining the residual stabilized coffee aroma-oil emulsion with soluble coffee solids.

9 Claims, No Drawings

STABILIZED ROASTED COFFEE AROMA

BACKGROUND OF THE INVENTION

1. Field of the Invention

This invention relates to the production of roasted coffee aroma for the enhancement of soluble coffee and, in particular, is directed to a process for stabilizing the roasted coffee aroma prior to the addition of the aroma to the soluble coffee dried solids.

2. Description of the Prior Art

A plethora of information has been published devoted to the production of soluble coffee. A significant proportion of this information is concerned with various techniques for enhancing the aroma and taste of the finished soluble coffee product. The ultimate goal has been, and continues to be, the production of a soluble coffee which yields a coffee beverage having the aroma and taste qualities equal to, or better, than that obtained from freshly roasted and ground coffee. Suffice it to say, within present knowledge, this goal has not been attained—at least on a commercial basis.

Efforts to improve upon the aroma (and taste) of soluble coffee have been directed to capturing the aroma of the roasted ground coffee prior to extracting the bulk of the soluble solids from the coffee and then adding-back of the aroma to the finished soluble coffee product or to the concentrated extract before it is dried. Other efforts, approaching the problem differently, have been directed to the development of extraction and dehydration processes which have a minimum of deleterious affect on the quality of the fragile aroma.

By far and large, most of the effort has been directed to capturing the soluble coffee aroma for subsequent add-back to the bulk of the soluble coffee material, and the literature is replete with descriptions of how this can be accomplished.

One approach toward producing a soluble coffee of improved quality has been to fortify the practically odorless soluble coffee powder with an added roasted coffee aroma. The added roasted coffee aroma manifests itself when the consumer opens the jar of soluble coffee. Since the aroma impact is similar to that obtained when opening a container of freshly roasted coffee, consumer acceptability of the aroma fortified soluble coffee is enhanced. Understandably, it is necessary that the roasted coffee aroma applied to the soluble coffee powder for this purpose be highly volatile such that, each time the soluble coffee jar is capped, the aroma accordingly concentrates in the enclosed space above the soluble coffee powder. For this reason, this type of aroma is usually designated "headspace" aroma—that aroma which emanates from the jar headspace when the cap is removed. Headspace aroma does not materially add any aroma or flavor to the beverage prepared from the soluble coffee.

Headspace aroma may be obtained from roasted coffee by collecting the gases driven off during grinding or by heating the ground roasted coffee and condensing the evacuated vapors. Also, steam extraction of roasted and ground coffee has proven to be an effective means of obtaining a satisfactory aroma for applying to soluble coffee powder for "headspace" aroma purposes.

U.S. Pat. No. 2,562,206 to Nutting discloses a process for preparing a coffee extract containing the volatile aroma-flavor obtained by steam treatment of the coffee. The steam, containing the volatile constituents derived from the roasted coffee prior to water extraction of the bulk of the soluble solids from the roasted coffee, is cooled to a condensate composed of the volatile constituents of the coffee in water.

Mahlman (U.S. Pat. No. 3,132,947) and Mahlman, et al. (U.S. Pat. No. 3,421,901) disclose improvements in the technique of obtaining "steam volatiles" from roasted coffee.

The highly volatile aroma obtained from roasted coffee by the above identified methods are composed of many complex chemicals which are very unstable. Although stabilizing processes have been developed, as typified by Mahlman, et al. (U.S. Pat. No. 3,421,901), wherein the aqueous mixture of roasted coffee aroma is combined with coffee oil, an effective method of intensifying and stabilizing roasted coffee "headspace" aroma for commercial application to soluble coffee powder, has not, until this invention, been realized.

Soluble coffee, when compared with roasted and ground coffee, offers the consumer the profound advantage of convenience of preparation of the coffee beverage; therefore, there exists a major incentive to improve upon this article of commerce by providing a stable roasted coffee aroma in the headspace of the product container.

SUMMARY OF THE INVENTION

Accordingly, it is a principal object of this invention to provide a soluble coffee product having superior aromatic properties compared to those soluble coffee products now enjoying wide commercial acceptance.

It is an object of this invention to provide an improved, fragrant, roasted coffee aroma for fortifying the negligible aroma associated with soluble coffee powder.

It is another object of this invention to provide said improved, fragrant roasted coffee aroma in a form whereby it retains its strength and original aromatic character over a long storage and use period.

It is still another object of this invention to provide an aromatized soluble coffee, which when packaged, releases aroma to the headspace of the container and, upon repeated opening of the container, provides the consumer with the aroma of freshly ground roasted coffee.

It is yet another object of the invention to provide a roasted coffee aroma which, when appropriately combined with soluble coffee powder, does not detract from the flavor, appearance, flowability or rehydration performance of the soluble coffee.

Briefly stated, the objects of this invention are accomplished by steam distilling freshly roasted and ground coffee, condensing the aroma-bearing aqueous mixture with trichlorotrifluoroethane, emulsifying the aroma-bearing solvent with an edible oil, (preferably coffee oil), and then plating the emulsion onto soluble coffee powder under processing conditions in which the trichlorotrifluoroethane substantially completely separates as a vapor from the emulsion and coffee powder.

The essence of the invention resides in the unexpected discovery that trichlorotrifluoroethane has the capability of extracting the desirable aromatic constituents from an aqueous phase of roasted coffee aroma and the ability to intensify and stabilize the extracted aroma.

The term "trichlorotrifluoroethane" used throughout this specification is intended to mean 1,1,2-trichloro-1,2,2-trifluoroethane ($Cl_2CF-ClCF_2$) and is not intended to include 1,1,1-trichloro-2,2,2-trifluoroethane.

The unique functionality of the trichlorotrifluoroethane toward effecting the above, and additional objects, features and advantages of the product of this invention will become more fully apparent upon consideration of the following detailed description of the preferred embodiments.

DESCRIPTION OF THE PREFERRED EMBODIMENTS

In carrying out the preferred embodiment of the present invention the starting material is an aqueous mixture of roasted coffee aroma obtained by steam distilling roasted and ground coffee followed by condensing the distillate. A wide range of operating conditions exists for obtaining the aqueous mixture of volatile coffee aroma and flavor. In general, the variables may be grouped as to those pertaining to the actual distilling conditions and to those pertaining to the method of collecting the distillate. The first group includes such variables as the particle size distribution of the roasted coffee, the moisture content of the roasted coffee, the geometry of the vessel containing the roasted coffee, steam quality, steam pressure, period of steaming, and the use of a static or agitated bed of roasted coffee. The second group of variables involves the method of venting the vessel before, during, and after steaming, the temperature within the vessel, the degree of reflux and the choice of the use of an external condenser.

The aforementioned process variables determine the amount, concentration and chemical content (quality) of the highly volatile and chemically reactive coffee aroma recovered as an aqueous mixture. Considerable effort has been made in the past to define conditions which will yield the most desirable coffee aroma and these efforts are reflected, for the most part, in the disclosures of Mahlman, U.S. Pat. No. 3,132,947; Mishkin, et al., U.S. Pat. No. 3,148,070; Nutting, U.S. Pat. No. 2,562,206; Mahlman, et al., U.S. Pat. No. 3,421,901; Clinton, et al., U.S. Pat. No. 3,244,531; and McCartney, U.S. Pat. No. 3,420,674. Common to all of the above cited techniques is the recovery of roasted coffee aroma in the form of an aqueous mixture. Importantly, the principle of the instant invention is applicable to all of the aqueous mixtures of roasted coffee aroma obtained by the above cited methods and variations thereof. The criterion of the instant invention being the roasted coffee aroma is stabilized by the trichlorotrifluoroethane after the aroma is separated from the roasted coffee solids. The mode of the invention, therefore, does not contemplate contact of the roasted coffee solids with the trichlorotrifluoroethane solvent and the possibility of extracting excessive amounts of coffee oil and aroma of the type not suitable for headspace purposes is avoided. In other words, the invention calls for the trichlorotrifluoroethane solvent to contact and stabilize only those highly volatile and chemically reactive aromas—those which are suitable for headspace aroma utility and, because of their profound chemical activity, require the degree of stabilization provided for by the fluorinated hydrocarbon.

In contrast to the prior art such as that disclosed in Reich (U.S. Pat. No. 3,155,523) wherein fluorinated compounds having two fluorine atoms bonded to each carbon atom, are employed as solvents for extracting oil-bearing aromatic constituents from roasted coffee, the trichlorotrifluoroethane solvent employed in this invention does not come in contact with the more stable aromatic constituents contained in the roasted coffee solids and, therefore, does not alter the transfer of these components to the soluble coffee solids in the normal course of soluble coffee production. Also, differentiating from Mastrangelo (U.S. Pat. No. 3,181,952) the trichlorotrifluoroethane solvent is not employed to treat soluble coffee powder per se as a method of enhancing the aroma and flavor of the powdered food.

Trichlorotrifluoroethane is a low temperature boiling (47.6° C.) fluorinated hydrocarbon which is substantially completely immiscible with water. While having great solvent affinity for roasted coffee aroma, the solvent does not appear to chemically react with the aroma. For purposes of practicing the preferred embodiment of this invention, it has been determined that volumetric ratios of trichlorotrifluoroethane to aqueous coffee aroma mixtures can range from 1:20 to 1:1 respectively for satisfactorily stabilizing the coffee aroma incident to extracting it from the aqueous phase at room temperature conditions, with the trichlorotrifluoroethane.

Although the exact mechanism of the stabilization effect is not fully understood, there is some evidence which indicates, that it is brought about, at least in part, by a fractionation operation wherein the trichlorotrifluoroethane extracts the more stable "woody" aroma fractions and leaves behind, in the aqueous phase, a major portion of the highly unstable carbonyl and ketone compounds which ordinarily provide the "-winey" and "buttery" notes to the aroma. The invention, however, should in no way be construed to be limited to this possible explanation of the unexpected stabilizing effect of the trichlorotrifluoroethane on the coffee aroma.

Although an excess of trichlorotrifluoroethane is not detrimental to the process of the invention, it is preferable to use an amount calculated to be limited to that just sufficient to extract the desirable coffee aroma fractions from the aqueous phase. In practice it has been determined that a quantity of trichlorotrifluoroethane approximately equal in volume to the aqueous coffee aroma mixture is adequate to extract and stabilize the aroma contained in the aqueous liquid resulting from typical roasted coffee steam distillations as cited above.

As is well known, the coffee aroma obtained by steam distillation is highly reactive and rapidly undergoes chemical decomposition. It is, therefore, essential to the success of the invention that the coffee aroma be recovered from the aqueous phase and stabilized with the trichlorotrifluoroethane directly following the steam distillation process, or at a later time only if the aroma-containing condensate has been adequately preserved under suitable temperature and other environmental conditions.

Since the partition coefficient for coffee aroma is highly in favor of the trichlorotrifluoroethane, the employment of this solvent involves only a moderate mixing and agitation with the aqueous mixture to effect the desired extraction and degree of fractionation of the aroma incident to stabilization. Advantage is then taken of the difference in density of the two immiscible liquids, to bring about a substantially complete separation of the two phases by either gravitational or centrifugal forces and the water phase, after separation from the aroma-bearing trichlorotrifluoroethane, is usually discarded.

The roasted coffee aroma, once incorporated in the trichlorotrifluoroethane phase, is relatively stable compared with its rate of decomposition in the aqueous phase. Nevertheless, it is preferable that the coffee aroma-containing trichlorotrifluoroethane be emulsified with an edible oil to assure prolonged stability of the aroma. This step in the sequence of process operations should take place as soon as is practically possible after the aroma has been transferred to the fluorinated hydrocarbon phase.

In addition to assuring an additional degree of stabilization, the edible oil acts as a vehicle for plating or otherwise combining the stabilized aroma with soluble coffee powder. Although coffee oil is the preferred edible oil for this purpose, other vegetable oils such as refined corn oil and cottonseed oil may be employed, as well as mixtures thereof.

In practice it has been determined that an emulsion of coffee aroma-containing trichlorotrifluoroethane and coffee oil may be obtained by vigorously shaking equal volumes of the two liquids. The use of a small amount of emulsifying agent approved for food use is optionally employed, especially if the resulting emulsion is to be stored for an extended period of time before being plated onto the soluble coffee. On a commercial scale, the emulsion can be readily effected with the use of typical homogenization equipment with or without the aid of an emulsifying agent.

It has been found that the desired results of the present invention are obtained when the aroma bearing trichlorotrifluoroethane is combined with coffee oil at a volumetric ratio of about 0.9 : 1 to 48 : 1 and preferably at a ratio of 1.7 : 1. While desired ratios of coffee aroma bearing trichlorotrifluoroethane to coffee oil have been set forth, other less desirable ranges may also be employed, but with a resultant loss in aromatization effect.

In contrast to the prior art (cf. Clinton, U.S. Pat. No. 3,244,533), wherein the aqueous coffee aroma mixture is directly combined with the coffee oil, the instant invention comprehends the essential interposing operation of extracting the roasted coffee aroma from the aqueous phase and stabilizing it prior to the transfer of the aroma to the edible oil phase — it is the employment of the fluorinated hydrocarbon, at this phase of the process, to intensify and stabilize the coffee aroma generated by the steam distillation of roasted coffee that forms the crux of the invention which leads to the unexpected improvements in the resultant soluble coffee headspace aroma.

The coffee aroma bearing trichlorotrifluoroethane coffee oil emulsion may be stored for extended periods of time without noticeably affecting the quality of the aroma provided proper storage conditions are employed. It is preferable, however, that freshly prepared emulsion be combined (plated) with the soluble coffee powder.

The aromatized oil emulsion may be combined with the soluble coffee powder in any of a variety of standard methods, but it is preferable that the procedure described in Clinton, et al. (U.S. Pat. No. 3,077,405) be employed in order to produce a finished uniformly aromatized coffee powder with good flowability characteristics.

It has been determined that finished soluble coffee products with satisfactory headspace aroma characteristics can be produced with a quantity stabilized aroma fortified oil equal to 0.5 to 0.3 percent of the weight of the coffee solids. This quantity of aromatizing oil emulsion is appreciably lower than the oil level usually employed as a carrier for coffee aroma which has not been intensified and stabilized with trichlorotrifluoroethane. The lower aromatized coffee oil emulsion requirements, therefore, favorably affect the flowability of the finished product of this invention compared with previous oil plated coffee powders.

The thermal properties and vapor pressure characteristics of trichlorotrifluoroethane permit ease of separation of the fluorinated hydrocarbon from the aromatized oil emulsion prior to or coincidentally with plating the emulsion onto the soluble coffee powder. During the plating of the coffee powder, approximately 75–80 percent of the trichlorotrifluoroethane evaporates from the emulsion as it is sprayed onto the coffee powder under room temperature operating conditions. At higher temperatures, but still well below temperatures which affect the aroma of the fortified product, it is estimated practically all of the trichlorotrifluoroethane is dissipated in the form of a vapor and removed from the final product. The residual trichlorotrifluoroethane which does remain in the plated emulsion has no detectable affect on the resultant headspace aroma nor on the aroma or flavor of the prepared beverage.

The following examples are illustrative but are not to be construed as limiting as to the preparation of the coffee aroma of this invention and its incorporation with the finished soluble coffee product. The percentages expressed are on a weight basic unless otherwise indicated.

EXAMPLE I a. Volatile roasted coffee flavor aromatics were obtained in an enriched aqueous condensate by steam distilling the freshly roasted and ground coffee contained in a commercial sized percolator according to the procedures described in Mahlman, U.S. Pat. No. 3,132,947.

b. An aliquot of the aqueous condensate enriched with the highly volatile aromatics was mixed with an equal volume of trichlorotrifluoroethane (food grade) and shaken for approximately 10 to 15 minutes in a separatory funnel at 75° F. During this operation the desirable aromatics of the roasted and ground coffee were transferred to the trichlorotrifluoroethane phase.

c. Two parts, by volume, of the aromatized trichlorotrifluoroethane were then emulsified with one part, by volume, of refined coffee oil by manually shaking the contained liquids.

d. The emulsion was then spray plated onto soluble coffee at levels of 0.1 to 0.4 percent by weight of the soluble coffee.

e. The above soluble coffee products were evaluated and compared with a soluble coffee product which had been spray plated with 0.4 percent coffee oil not containing any added aroma.

The soluble coffee products prepared in accordance with the teachings of this invention exhibited:

1. A stable headspace aroma
2. Greater aroma impact of roasted and ground coffee notes emanating from the headspace of container than from a jar containing soluble coffee spray plated with unfortified coffee oil.
3. An aroma impact equal to the conventional oil plated soluble coffee but with a reduced level of aroma fortified oil.

EXAMPLE II a. About 1,000 pounds of roasted coffee beans ground to a particle size range whereat 95 percent remained on a No. 20 U.S. Standard Sieve Mesh Screen and 5 percent remained on a No. 8 U.S. Standard Sieve Mesh Screen were introduced to fill a commercial size stainless steel extraction column.

b. Saturated steam was introduced into the bottom of the nonvented extraction column and passed upwardly through the ground roasted coffee.

c. When the pressure within the column reached 30 psig., the steam line to the column was closed and the roasted coffee was held in contact with the steam and steam condensate in the nonvented column for 2 minutes.

d. After the 2-minute holding period the steam volatile vapors within the extraction column were vented from the top of the extraction column and passed through a condenser (45° F. – 50° F.) and collected as an aroma enriched condensate. e. Of the 18,240 mls. of aroma enriched condensate collected, 680 ml. were combined with 680 ml. of trichlorotrifluoroethane (food grade) and agitated in stainless steel container for 15 minutes.

f. The agitation was stopped and after gravity separation of the two immiscible liquids the aqueous phase (680 ml.) was decanted and discarded.

g. Approximately 680 ml. of roasted coffee aroma enriched trichlorotrifluoroethane was recovered in step (f) and then homogenized with 360 grams of coffee oil.

h. The aromatized trichlorotrifluoroethane - coffee oil emulsion was then uniformly spray plated onto 400 lbs. of unaromatized soluble coffee powder corresponding to plating the coffee with 0.2 percent coffee oil.

The soluble coffee plated with the aromatized trichlorotrifluoroethane — coffee oil emulsion was compared organoleptically with soluble coffee plated with coffee oil only and was found to be different from the control and preferred with regard to aroma intensity.

While the foregoing has illustrated and described, what is now contemplated to be the best mode of carrying out the invention, the preferred embodiments are, of course, subject to modification without departing from the spirit and scope of the invention. Therefore, it is not desired to restrict the invention to the particular embodiments illustrated and described, but to cover all modifications that may fall within the scope of the appended claims.

Having described the invention, what is claimed as new and desired to be secured by Letters Patent is:

1. A process for the recovery and stabilization of roasted coffee aroma which consists of:
   a. extracting the highly volatile and chemically active aroma from roasted coffee by a process of steam distillation;
   b. condensing the aroma-bearing steam distillate whereby an aqueous mixture of coffee aroma is obtained;
   c. solvent extracting the coffee aroma from the aqueous mixture with 1,1,2-trichloro - 1,2,2-trifluoroethane; and concomitantly
   d. stabilizing the extracted aroma with the 1,1,2-trichloro - 1,2,2-trifluoroethane;
   e. separating the stabilized aroma-containing 1,1,2-trichloro - 1,2,2-trifluoroethane from the aqueous phase by gravitational and/or centrifugal force;
   f. emulsifying the stabilized aroma-containing 1,1,2-trichloro - 1,2,2-trifluoroethane with an edible oil; and
   g. separating a major portion of the 1,1,2-trichloro - 1,2,2-trifluoroethane as a vapor from the oil emulsion whereby the stabilized aroma with residual 1,1,2-trichloro - 1,2,2-trifluoroethane remains emulsified in the edible oil.

2. The process of claim 1 wherein the quantity of steam distillate collected as an aqueous mixture of coffee aroma ranges from about 5 ml. to about 25 ml. per lb. of roasted ground coffee employed as the source of the coffee aroma.

3. The process of claim 1 wherein the volumetric ratio of 1,1,2-trichloro - 1,2,2-trifluoroethane to aqueous mixture of coffee aroma ranges from about 1:20 to about 1:1 when employed to extract the coffee aroma from the aqueous phase.

4. The process of claim 1 wherein the volumetric ratio of edible oil to coffee aroma-containing 1,1,2-trichloro 1,2,2-trifluoroethane ranges from about 1:0.9 to about 1:48 when employed to form the stabilized coffee aroma emulsion.

5. The invention of claim 1 wherein the edible oil is coffee oil.

6. The invention of claim 1 wherein the edible oil is corn oil.

7. The invention of claim 1 wherein the edible oil is cottonseed oil.

8. The stabilized coffee aroma product obtained by the process of claim 1.

9. Soluble coffee combined with the product of claim 8.

* * * * *